United States Patent
Kim et al.

(10) Patent No.: US 6,307,535 B1
(45) Date of Patent: Oct. 23, 2001

(54) POINTING DEVICE FOR USE IN A COMPUTER SYSTEM

(75) Inventors: Kyoung-Jin Kim, Seoul; Kwang-Ho Song, Kyounggi-do, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/267,651

(22) Filed: Mar. 15, 1999

(30) Foreign Application Priority Data

Mar. 14, 1998 (KR) .................................................. 98-8678

(51) Int. Cl.$^7$ ...................................................... G09G 5/08
(52) U.S. Cl. ......................... 345/157; 345/156; 345/158; 345/163; 345/168
(58) Field of Search .................................. 345/156, 157, 345/158, 168, 163

(56) References Cited

U.S. PATENT DOCUMENTS

| | | | |
|---|---|---|---|
| 4,712,101 | 12/1987 | Culver | 74/471 XY |
| 4,724,715 | 2/1988 | Culver | 74/471 R |
| 4,763,116 | 8/1988 | Eichholz | 345/184 |
| 4,799,049 | * 1/1989 | Avila | 345/157 |
| 4,823,634 | 4/1989 | Culver | 345/157 |
| 4,896,554 | 1/1990 | Culver | 74/471 XY |
| 4,928,093 | * 5/1990 | Rahman | 345/157 |
| 4,937,564 | * 6/1990 | Oberg | 345/168 |
| 4,982,618 | 1/1991 | Culver | 74/471 XY |
| 5,126,723 | * 6/1992 | Long et al. | 345/157 |
| 5,235,868 | * 8/1993 | Culver | 74/471 XY |
| 5,270,690 | * 12/1993 | Oberg | 345/163 |
| 5,563,631 | 10/1996 | Masunaga | 345/169 |
| 5,644,337 | 7/1997 | Stacy | 345/167 |
| 5,666,138 | 9/1997 | Culver | 345/161 |

\* cited by examiner

*Primary Examiner*—Richard Hjerpe
*Assistant Examiner*—Keon M. Nguyen
(74) *Attorney, Agent, or Firm*—Robert E. Bushnell, Esq.

(57) ABSTRACT

A pointing device for controlling cursor movement on a computer display by entering positional information into the computer includes: a housing having an upper opening and a lower inside base directly facing the upper opening; a cylindrical bar mounted on the lower inside base so as to rotate around and slide along its central axis in the upper opening; a plurality of first marking lines disposed around a part of the periphery of the cylindrical bar adjacent to one end thereof, the first marking lines being in parallel with the central axis and having a constant interval between adjacent marking lines, and the first marking lines being extended to a given length from the one end; a plurality of second marking lines disposed around another part of the periphery of the cylindrical bar adjacent to another end thereof, the second marking lines being perpendicular to the first marking lines and having a constant interval between adjacent marking lines, the second marking lines being extended to a given length from the another end; and a detection circuit for respectively measuring the rotational and sliding movements of the cylindrical bar by sensing the movements of the first and second marking lines; and a microcomputer for analyzing the detection signal produced by the detection circuit to obtain the positional information.

19 Claims, 19 Drawing Sheets

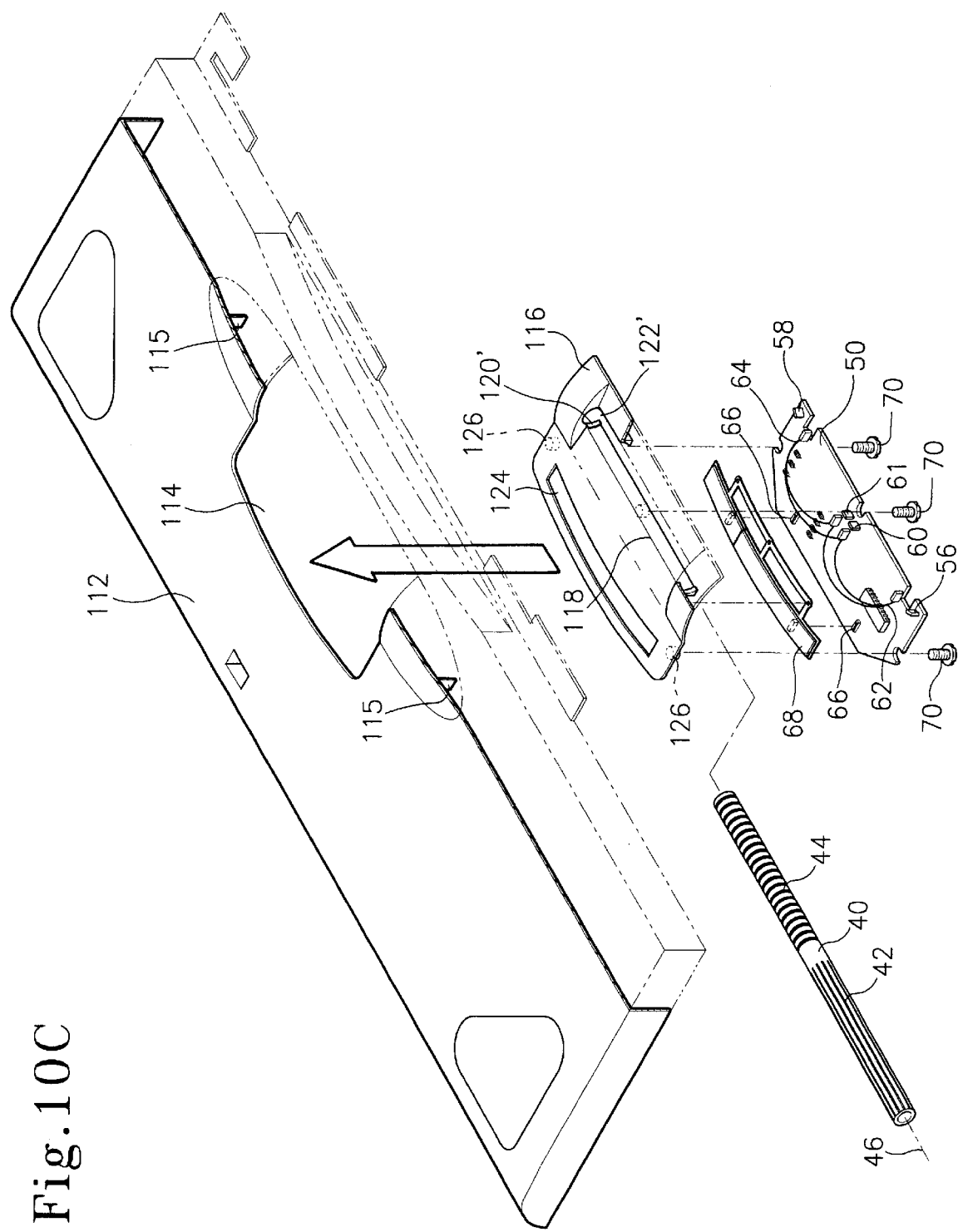

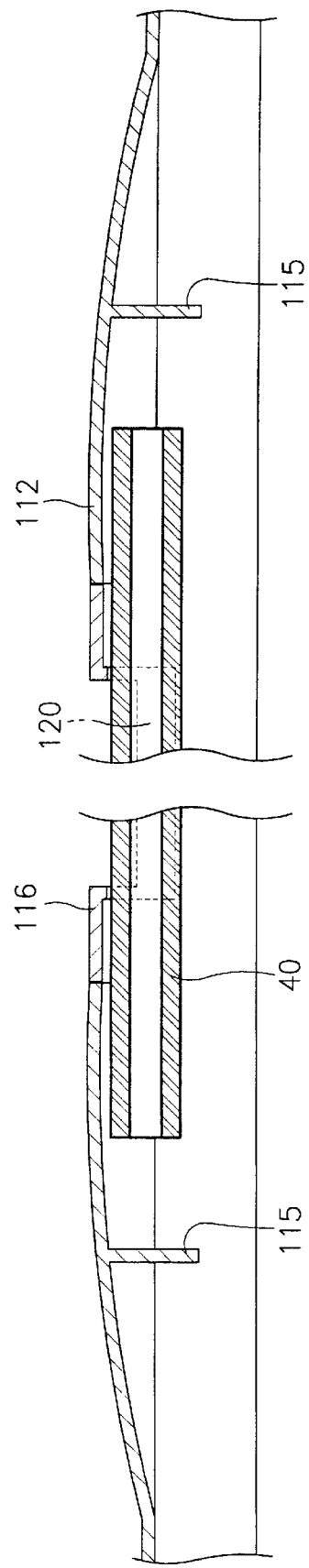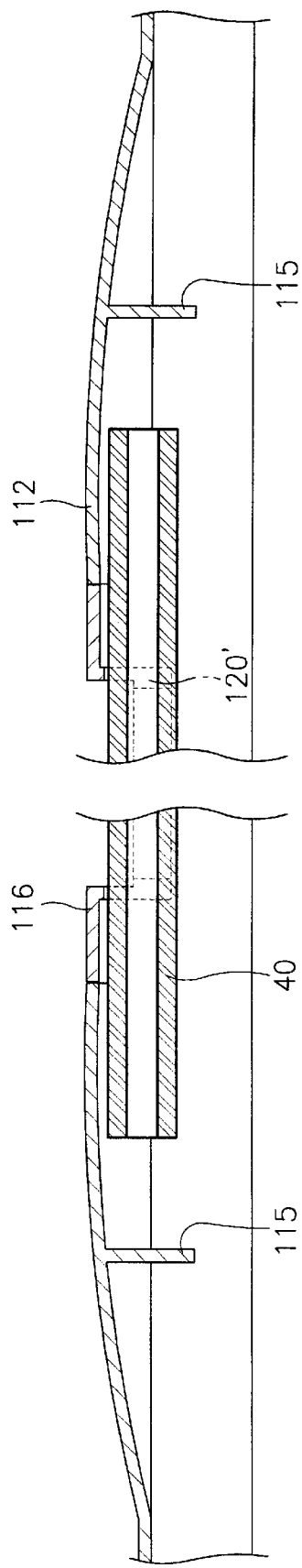

POINTING DEVICE FOR USE IN A COMPUTER SYSTEM

CLAIM OF PRIORITY

This application makes reference to, incorporates the same herein, and claims all benefits accruing under 35 U.S.C. §119 from an application for POINTING DEVICE FOR USE IN A COMPUTER SYSTEM earlier filed in the Korean Industrial Property Office on the Mar. 14 1998 and there duly assigned Ser. No. 8678/1998.

BACKGROUND OF THE INVENTION

1. Field of the Invention

The present invention concerns a pointing device or cursor control device such as a mouse, which controls movement of the cursor on a computer display by entering positional information into a computer.

2. Related Art

Because it is very difficult for users to interact with a computer system using a large keyboard, a mouse used as a pointing device has been developed to control the movement of the cursor on the computer display. Moreover, if the user wants to control the cursor on the display of a computer system operated in a graphic user interface, it is very inconvenient for him to enter positional information into the computer. The mouse generally comprises a small housing with two or three buttons on the top used to indicate that desired positions have been reached, and a sensor built into the underside of the housing which is rolled around on any flat surface. Its direction of movement is sensed and transmitted to the computer, which translates the movement into cursor movement on the display screen.

Conventional pointing devices suffer various drawbacks including the fact that it is very difficult to achieve a precise cursor movement, especially in drawing a straight line. This means that the conventional pointing devices are not adequate to effectively manage the entering of positional information into the computer. Furthermore, their size serves as a limitation in reducing the size of the notebook computer.

The following patents each disclose features in common with the present invention: U.S. Pat. No. 4,712,101 to Culver, entitled CONTROL MECHANISM FOR ELECTRONIC APPARATUS, U.S. Pat. No. 4,823,634 to Culver, entitled MULTIFUNCTION TACTILE MANIPULATABLE CONTROL, U.S. Pat. No. 4,724,715 to Culver, entitled CONTROL MECHANISM FOR COMPUTER KEYBOARD AND THE LIKE, U.S. Pat. No. 4,896,554 to Culver, entitled MULTIFUNCTION TACTILE MANIPULATABLE CONTROL, U.S. Pat. No. 4,982,618 to Culver, entitled MULTIFUNCTION TACTILE MANIPULATABLE CONTROL, U.S. Pat. No. 5,666,138 to Culver, entitled INTERFACE CONTROL, U.S. Pat. No. 4,763,116 to Eichholz, entitled INPUT APPARATUS FOR DESIGN WORK ON AN IMAGE-BEARING SCREEN, U.S. Pat. No. 5,563,631 TO Masunaga, entitled PORTABLE INFORMATION APPARATUS, and U.S. Pat. No. 5,644,337 to Stacy, entitled TRACKBALL HAVING SINGLE EMITTER-DETECTOR DETECTING CHOPPER WHEEL DIRECTION.

SUMMARY OF THE INVENTION

It is an object of the present invention to provide a pointing device by which the cursor movement is easily and precisely controlled.

It is another object of the present invention to provide a pointing device which may be compactly mounted in a notebook computer, thus considerably reducing its size.

According to an embodiment of the present invention, a pointing device for controlling cursor movement on a computer display by entering positional information into the computer comprises: a housing having an upper opening and a lower inside base directly facing the upper opening; a cylindrical bar mounted on the lower inside base so as to rotate around and slide along its central axis in the upper opening; a plurality of first marking lines disposed around a part of the periphery of the cylindrical bar adjacent to one end thereof, the first marking lines being in parallel with the central axis and having a constant interval between adjacent marking lines, the first marking lines being extended to a given length from the one end; a plurality of second marking lines disposed around another part of the periphery of the cylindrical bar adjacent to another end thereof, the second marking line being perpendicular to the first marking lines and having a constant interval between adjacent marking lines, the second marking lines being extended to a given length from the another end; a detection circuit for respectively measuring the rotational and sliding movements of the cylindrical bar by sensing the movements of the first and second marking lines, and a microcomputer for analyzing the detection signal produced by the detection circuit to obtain the positional information.

The present invention will now described more specifically with reference to the drawings attached only by way of example.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 10C is an exploded view illustrating the structure of the inventive pointing device having a different base structure for mounting the cylindrical bar before being mounted in the main housing of a notebook computer;

FIG. 13A is a cross-sectional view taken along line 13a–13b of FIG. 11;

FIG. 13B is a view similar to FIG. 13A except with the pointing device of FIG. 10C being mounted in the notebook computer;

DETAILED DESCRIPTION OF THE PREFERRED EMBODIMENTS

Figure 1:
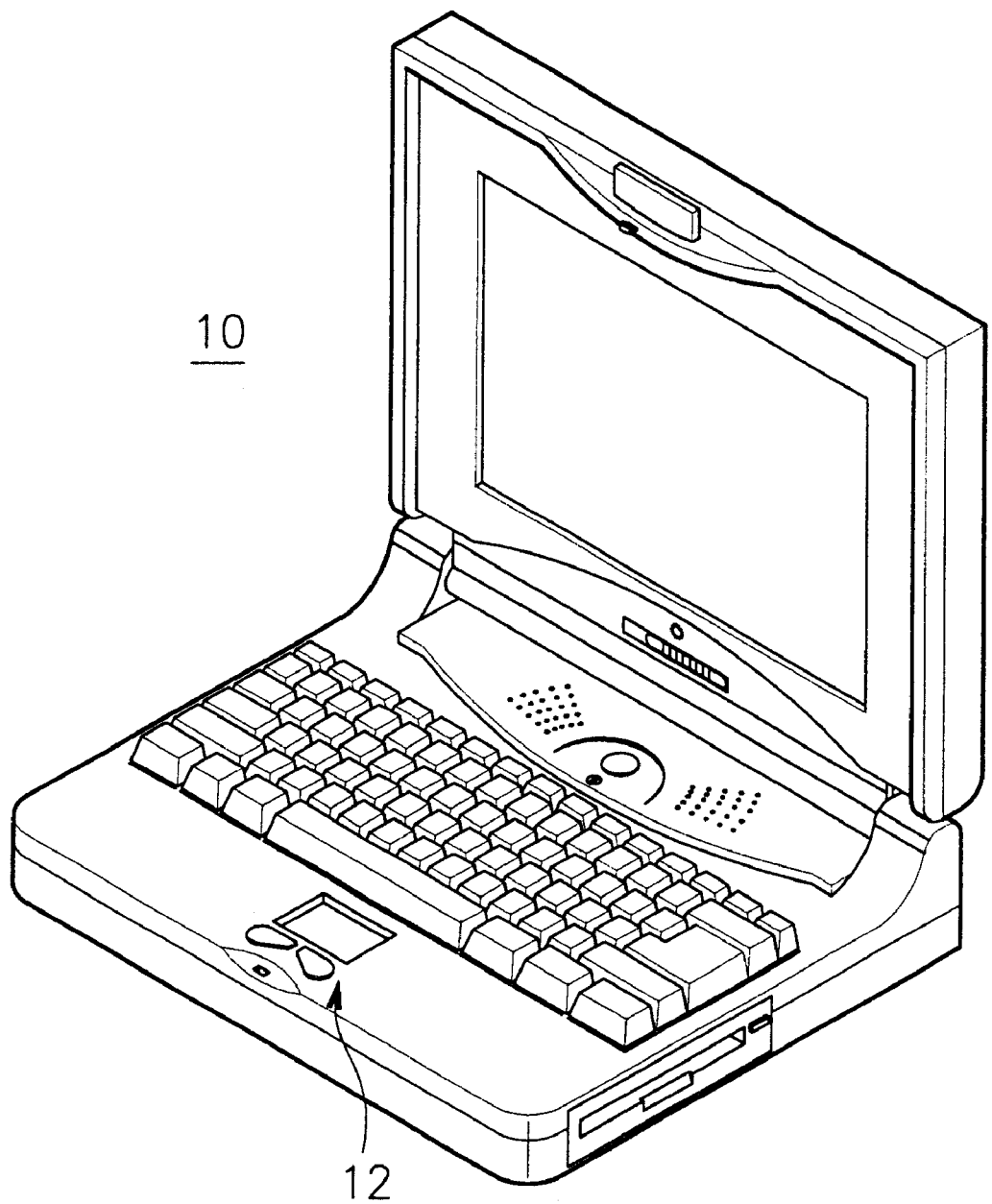
FIG. 1 is a perspective view for illustrating a notebook computer provided with a conventional touch pad.

Referring to FIG. 1, there is shown another kind of pointing device 12 called a touch pad, which is mounted in a notebook computer 10. Such a touch pad 12 includes a small electronic touch plate used to sense a finger touch to control the cursor movement.

Figure 2:
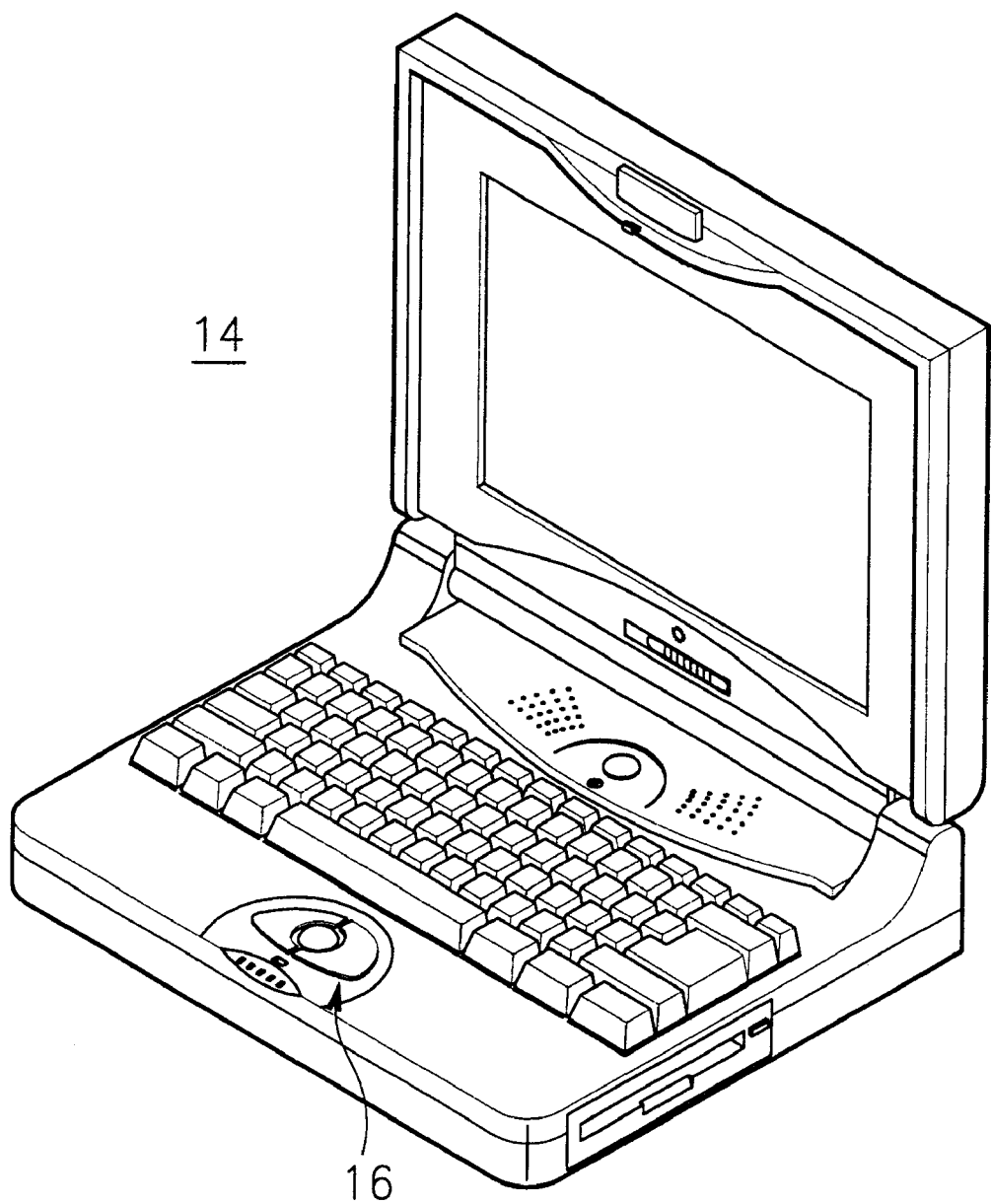
FIG. 2 is a view similar to FIG. 1 except provided with a conventional track ball.

Still another kind of pointing device is the track ball 16 as shown in FIG. 2, which is similar to the mouse in operation.

Figure 3:
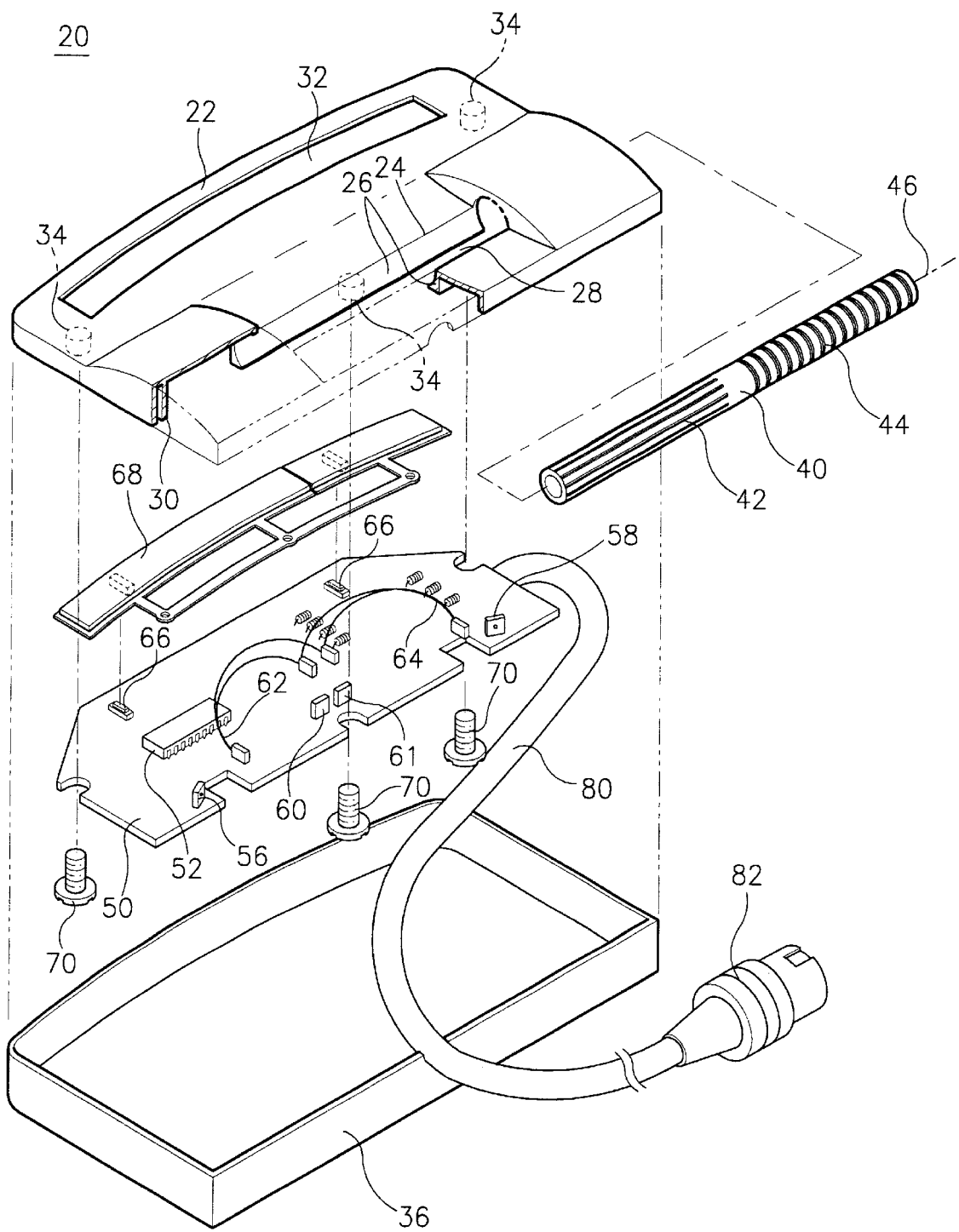
FIG. 3 is an exploded view of a pointing device according to an embodiment of the present invention.

Referring to FIG. 3, a pointing device 20 comprises a device housing consisting of an upper housing part 22 and a lower housing part 36, a cylindrical bar 40, a circuit board 50, and buttons 68. The cylindrical bar 40 is mounted on a lower inside base 26 formed in the upper housing part 22 and is exposed through an opening 24 to the outside of the upper housing part 22. The base 26 is designed to be directly under the opening 24, extended from both ends of the opening 24 toward the inside of the upper housing part 22. The surface of the base 26 is formed concave to fit the periphery of the cylindrical bar 40. The base 26 has a slot 28 elongated in the direction of the central axis of the cylindrical bar to divide the base surface into two parts for resiliently supporting it. The cylindrical bar 40 is made both to slide along the surface of the base 26 and to rotate about its central axis 46. The sliding movement of the cylindrical bar 40 may be limited by stoppers 30.

A plurality of first marking lines 42 are disposed around a part of the periphery of the cylindrical bar 40 adjacent to one end in parallel with the central axis 46 with a constant interval between the adjacent marking lines 42. The first marking lines 42 are extended to a given length from the one end. In addition, a plurality of second marking lines 44 are disposed around another part of the periphery of the cylindrical bar 40 adjacent to the other end perpendicularly to the first marking lines 42 with a constant interval between the adjacent marking lines 44. The second marking lines 44 are extended to a given length from the other end. The first and second marking lines 42 and 44 are black to absorb irradiated infrared rays (IR rays), and the intervals between the black marking lines are white lines to reflect the irradiated IR rays. The first and second marking lines 42 and 44 are formed so as not to be exposed through the opening 28 as the cylindrical bar 40 makes the sliding movements along the base 26.

The circuit board 50 is mounted with a microcomputer 52, a first light emitting diode (LED) 56, a second LED 58, a first phototransistor 60 and a second phototransistor 61. These elements are to detect the sliding and rotational movements of the cylindrical bar 40. The first and second LEDs 56 and 58 emit light beams under the control of the microcomputer 52. The first and second phototransistors 60 and 61 detect the light beams reflected by the cylindrical bar 40, transferring them to the microcomputer 52, which analyzes the received signals to generate the positional information of the cursor. In this way, the cursor may be moved on the display screen according to the positional information. The first and second LEDs 56 and 58 are mounted adjacent to the cylindrical bar 40 while the first and second phototransistors 60 and 61 are mounted far off it. First and second optical fibers 62 and 64 are arranged to form a transmission path for the light beams reflected on the cylindrical bar 40 to flow into the first and second phototransistors 60 and 61. Switches 66 mounted on the circuit board 50 are operated by the buttons 68 through an opening 32 formed in the upper housing part 22. The circuit board 50 is mounted on the inside of the upper housing part 22 by means of bosses 34 and screws 70. The bosses may be formed in the inside of the upper housing part 22, as shown in FIG. 3. The circuit board 50 is provided with a cable 80 having a connector 82, which may be connected to a PS/2 connector of a computer system, and modified to fit any computer system.

Figure 4:
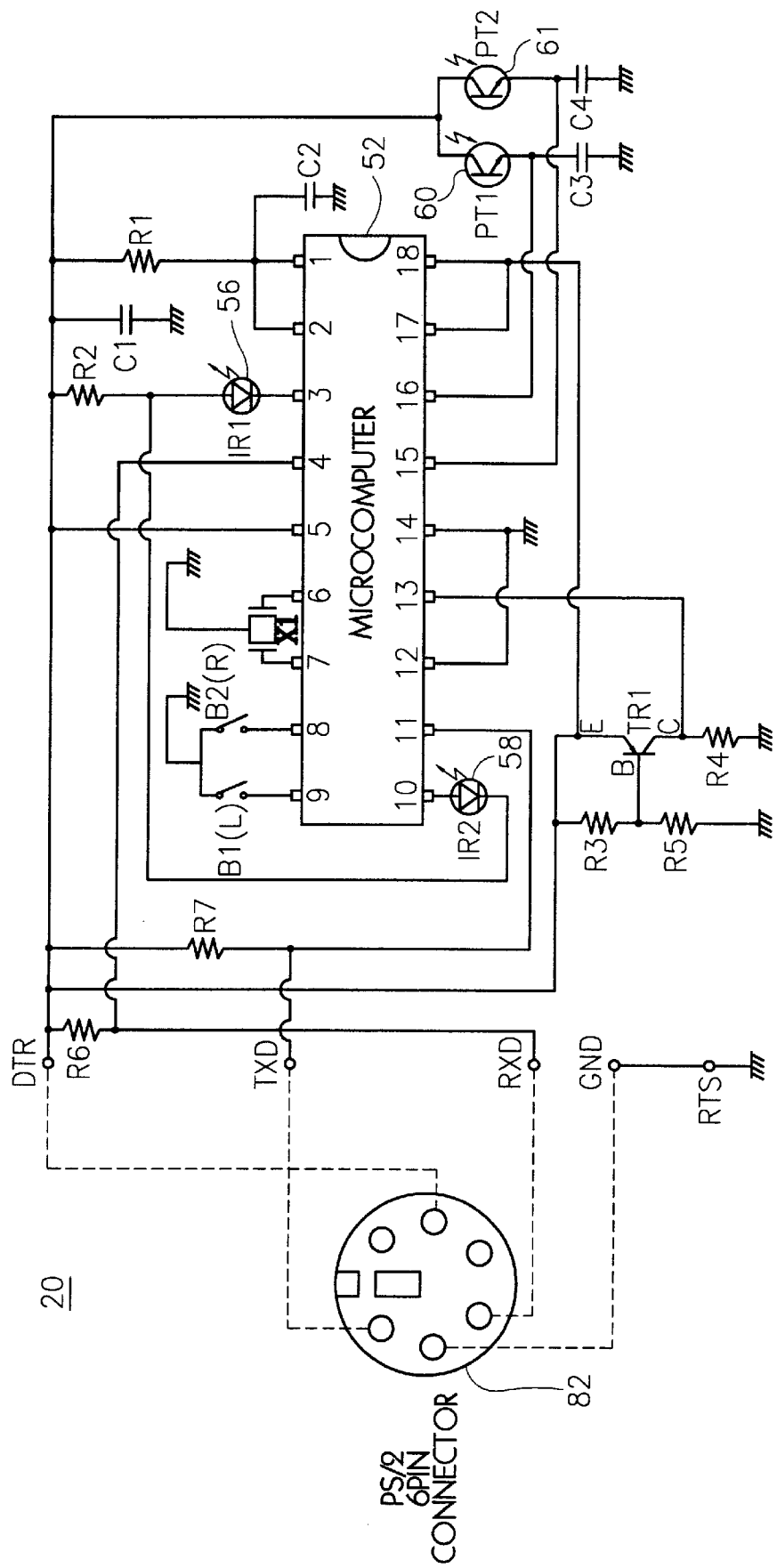
FIG. 4 is a circuit diagram applied to the pointing device as shown in FIG. 3.

As shown in FIGS. 3 and 4, the IR rays generated by the LEDs 56 and 58 under the control of the microcomputer 52 are reflected on the cylindrical bar 40, transmitted through the first and second optical fibers 62 and 64 to the first and second phototransistors 60 and 61, which in turn transfer the detected signals to the microcomputer 52. In this case, as the intervals between the first and second marking lines 42 and 44, i.e., white reflective lines, are displaced with the rotational and sliding movement of the cylindrical bar 40, the reflected light beams make some variations, which are detected by the phototransistors 60 and 61 to serve for the microcomputer 52 to determine the moving direction of the cylindrical bar 40. The number of the white or black marking lines displaced represents the displacement of the cylindrical bar during the rotational and sliding movement, which is transformed by the microcomputer 52 into the positional information of the cursor transferred through the connector 82 to the main computer system. Thus, if the cylindrical bar is slidingly moved sideways without any rotational movement, the cursor moves orthogonally toward the right or left side. Conversely, if the cylindrical bar is rotated without any sliding movement, it moves orthogonally toward the upper or lower end.

Hereinafter, the process for obtaining the positional information of the cursor by the cylindrical bar of the pointing device will be described more specifically in reference to FIGS. 5 to 9.

Figure 5:
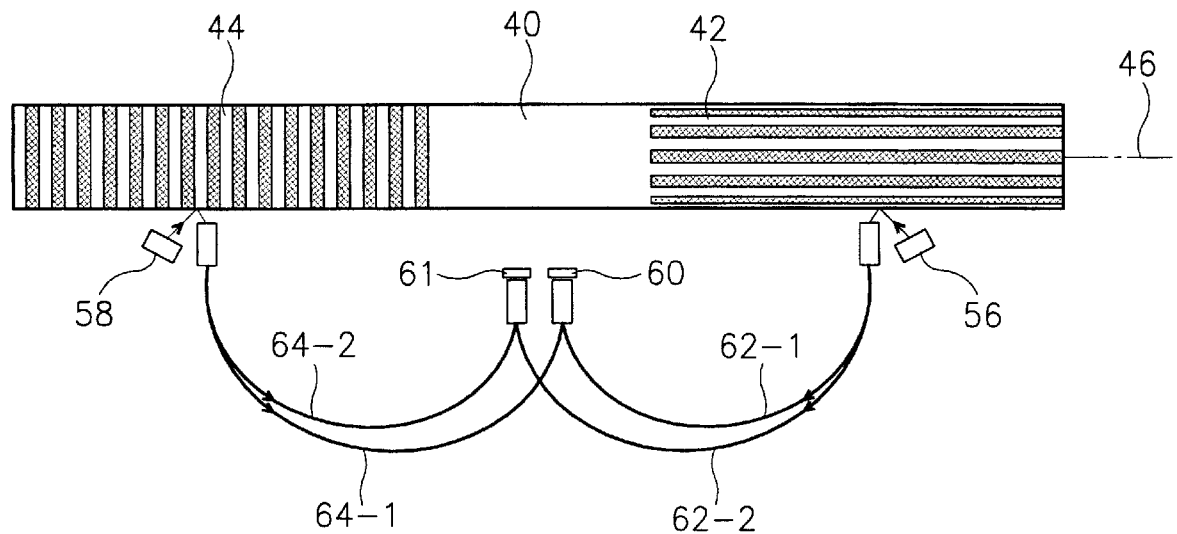
FIG. 5 is a schematic diagram illustrating the detection elements for detecting the movements of the cylindrical bar of the pointing device as shown in FIG. 3.

Referring to FIG. 5, the light beams generated by the first and second LEDs 56 and 58 under the control of the microcomputer 52 are reflected on the white lines between the first and second marking lines 42 and 44, and transmitted through the first and second optical fibers 62-1, 62-2 and 64-1 and 64-2 to the first and second phototransistors 60 and 61, which convert the received light beams into electrical signals transferred to the microcomputer 52 to calculate the direction and displacement of the cursor. As shown in the drawing, each of the first and second optical fibers is divided into two optical fibers respectively connected to the first and second phototransistors 60 and 61.

Figure 6A:
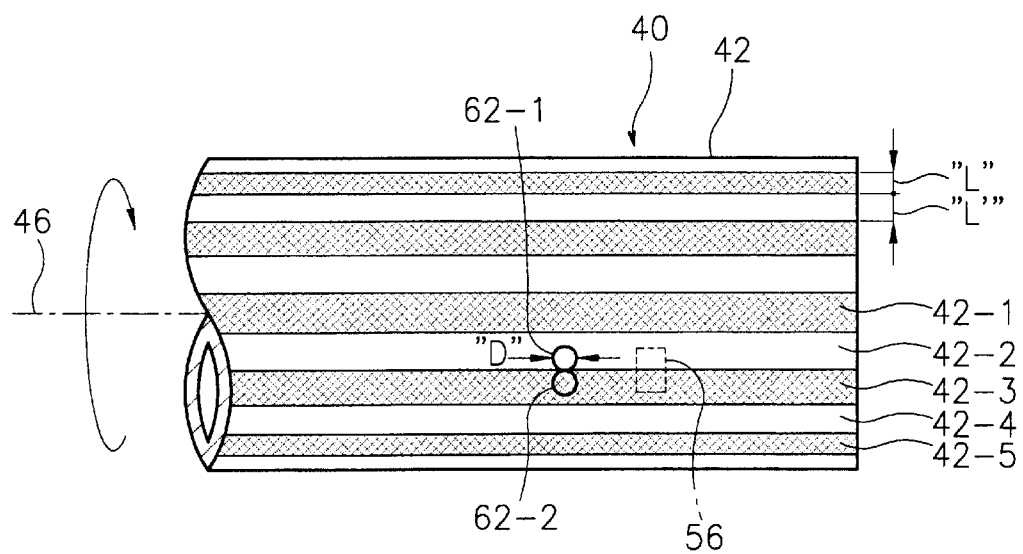
FIGS. 6A to 6C illustrate the procedure of detecting the rotational movement of the cylindrical bar.
Figure 6B:
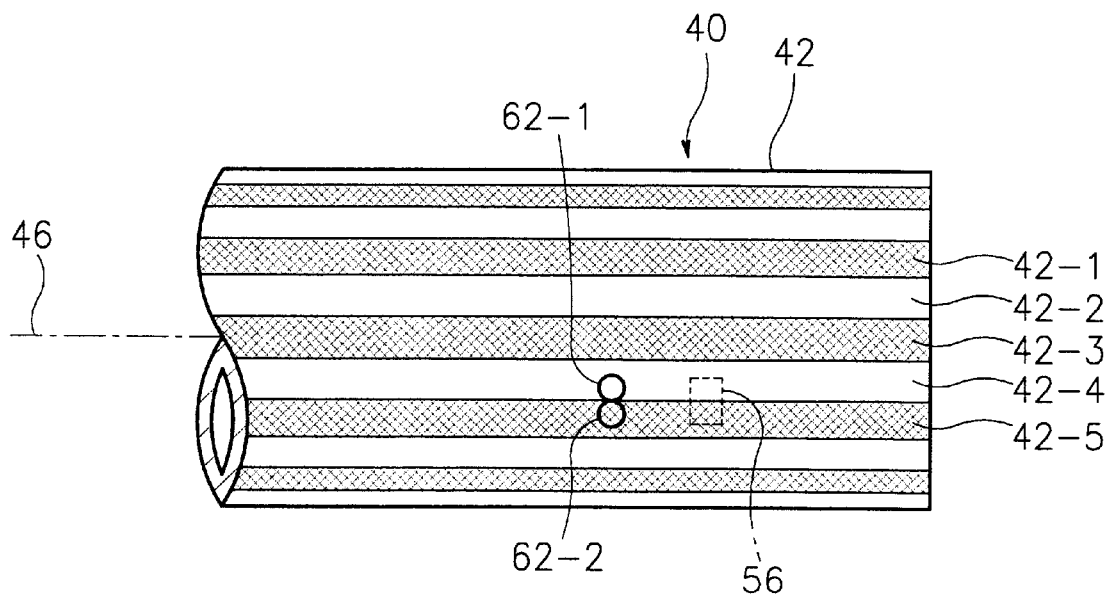

FIGS. 6A and 6B schematically show the rotational displacement of the cylindrical bar 40 corresponding to one pulse detected by the first and second phototransistors 60 and 61. As previously described, the first marking lines 42 are formed parallel with the central axis 46 of the cylindrical bar 40, and black not to reflect the light beams as indicated by reference numerals 42-1, 42-3, 42-5 in the drawings. The reflection of the light beams is made by the white interval lines 42-2, 42-4 between the black marking lines. The first optical fiber 62 consists of a first and a second sub-fiber 62-1 and 62-2, which are arranged perpendicularly to the central axis 46 and thus, to the first marking lines 42. The width "L" of each white reflective line is equal to the width "L" of each black marking line. The relationship between the diameter "D" of each of the optical fibers 62-1 and 62-2 and the width "L" is preferably 2D <L. If the width "L" is too small compared to the diameter "D", the phase difference between the IR rays becomes not enough to meet the proper control of the cursor. Conversely, if the width "L" is too large compared to the diameter "D", the number of the marking lines 42 is so reduced as to make impossible the precise control of the cursor movement. If the cylindrical bar 40 is rotated in the direction of the arrow indicated in FIG. 6A by the amount corresponding to one pulse detected by the first and second phototransistors 60 and 61 from the position where the optical fiber 62-1 faces white reflective line 42-2 and the optical fiber 62-2 black marking line 42-3, then the optical fiber 62-1 moves to face white reflective line 42-4 and the optical fiber 62-2 black marking line 42-5.

Rotating the cylindrical bar from the position of FIG. 6A to the position of FIG. 6B, the first and second phototransistors 60 and 61 respectively generate a first and a second pulse Ea and Eb corresponding to the light beams, which are obtained by the light beam of the LED 56 reflected on the first marking lines 42 and transmitted through the optical fibers 62-1 and 62-2 to the phototransistors 60 and 61. In this case, there is a phase difference between the first and second pulses Ea and Eb because the light beam reflected on the marking lines 42 is received by the two optical fibers 62-1 and 62-2 at different times. This phase difference serves to determine the direction of the cursor displacement. Namely, if the phase difference is positive, the cursor displacement is in the positive direction of the X-axis on the screen. Conversely, if the phase difference is negative, the cursor displacement is in the negative direction of the X-axis. Of course, the displacement of the cursor may be obtained by counting the number of the generated pulses Ea or Eb.

Figure 7A:
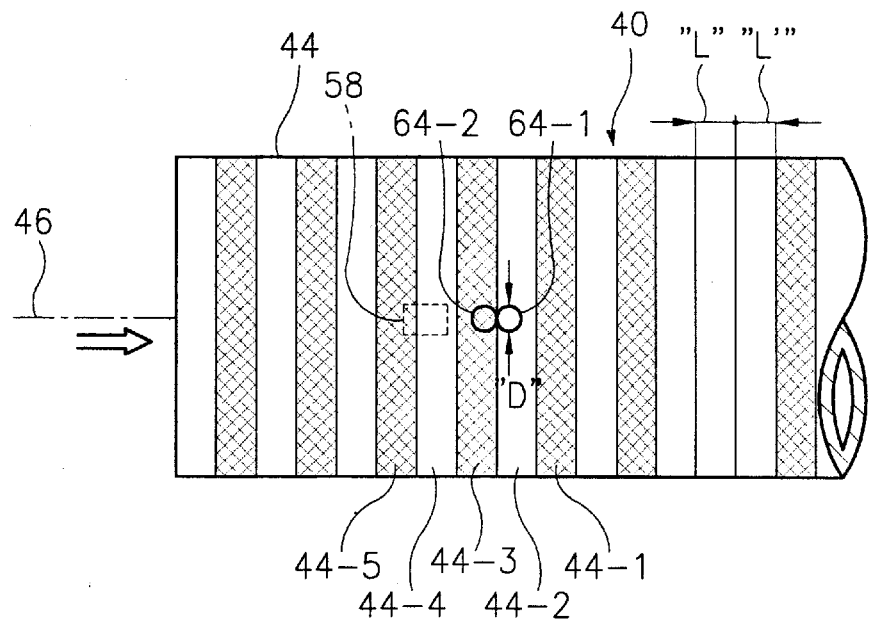
FIGS. 7A to 7B illustrate the procedure of detecting the sliding movement of the cylindrical bar.
Figure 7B:
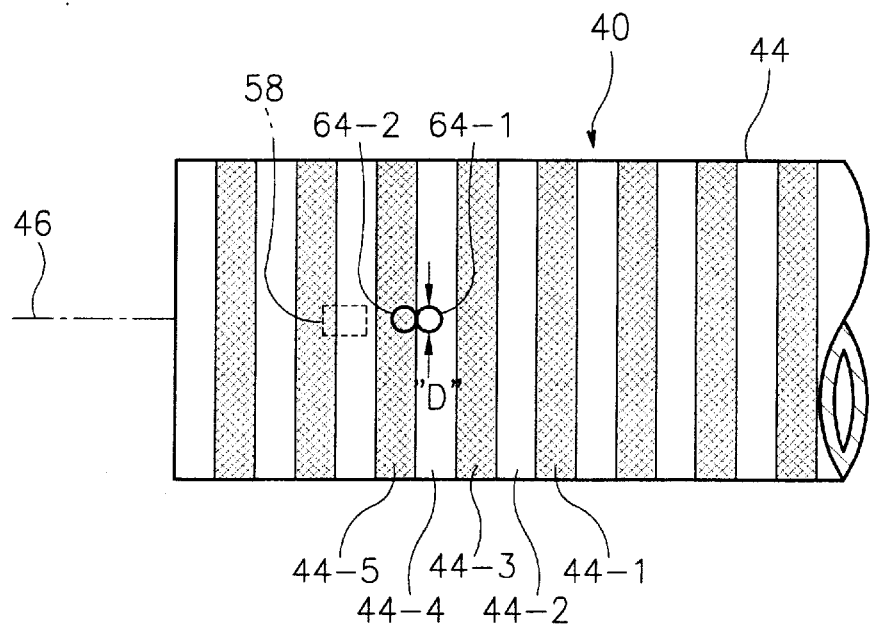

Alternatively, FIGS. 7A and 7B schematically show the sliding displacement of the cylindrical bar 40 corresponding to one pulse detected by the first and second phototransistors 60 and 61. As previously described, the first marking lines 44 are formed perpendicular to the central axis 46 of the cylindrical bar 40, and black not to reflect the light beams as indicated by reference numerals 44-1, 44-3, 44-5 in the drawings. The reflection of the light beams is made by the white interval lines 44-2, 44-4 between the black marking lines. The second optical fiber 64 consists of a first and a second sub-fiber 64-1 and 64-2, which are arranged perpendicularly to the central axis 46 and in parallel with the second marking lines 44. Other technical details concerning the second marking lines are basically the same as those of the first marking lines, and have therefore been omitted for convenience.

Figure 8:
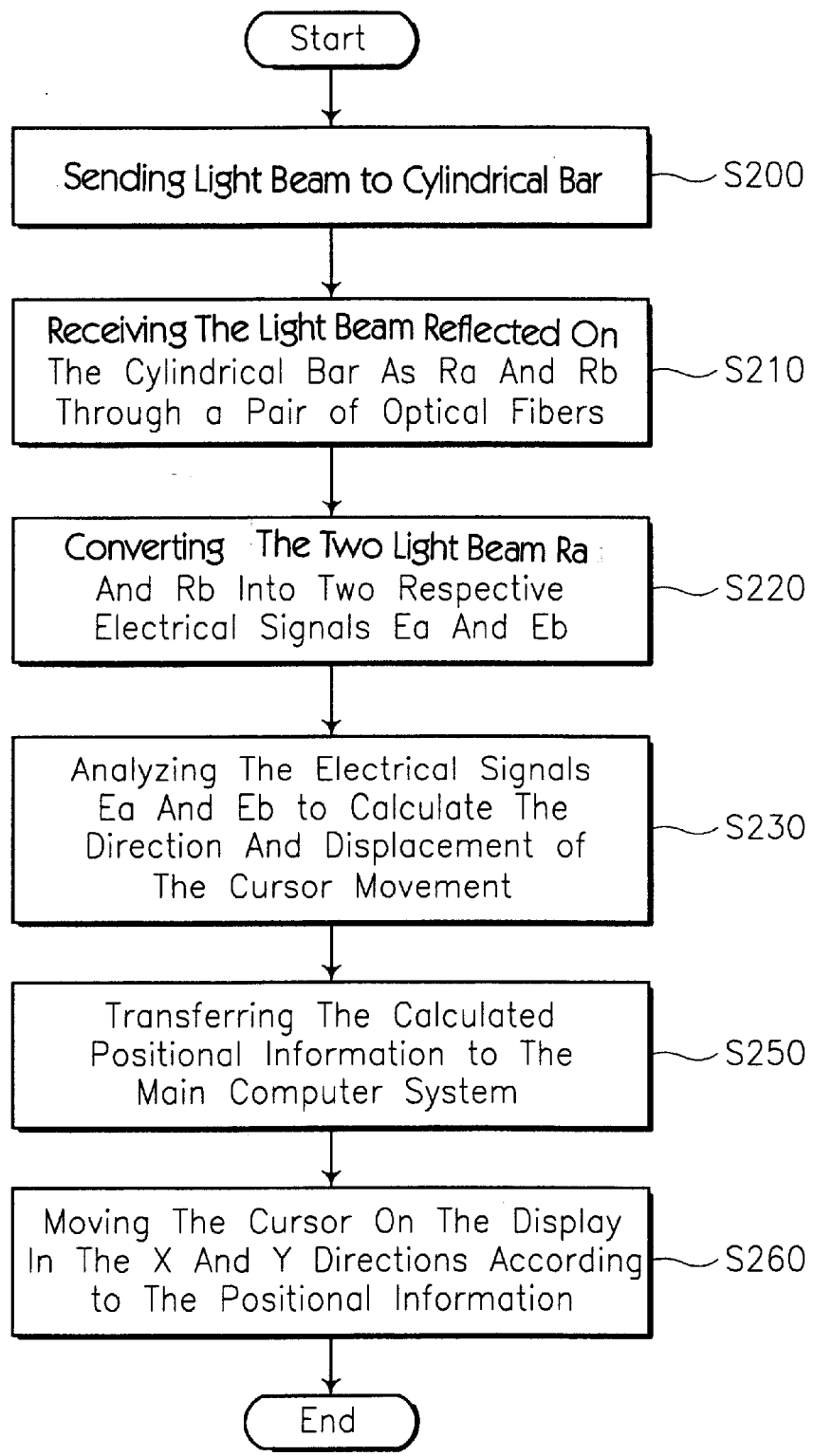
FIG. 8 is a flowchart illustrating the steps of moving the cursor by means of the inventive pointing device.
Figure 9:
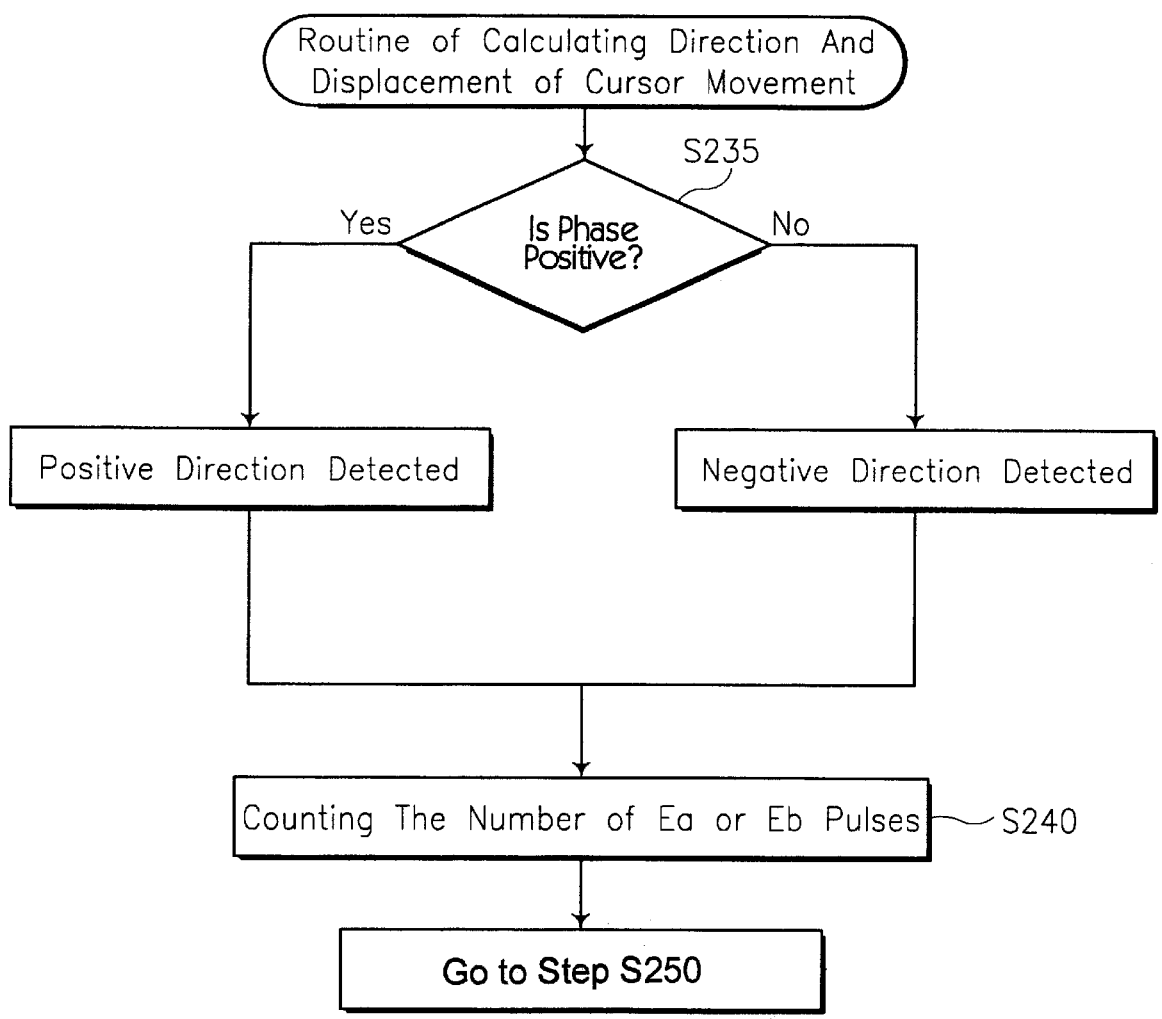
FIG. 9 is a flowchart illustrating the steps of determining the displacement and direction of the cursor.

FIGS. 8 and 9 show the steps of obtaining the positional information of the cursor by detecting the movement of the cylindrical device of the pointing device under the control of the microcomputer 52. Referring to FIGS. 4, 5 and 8, the light beam generated by the first or second LED 56 or 58 is sent to the cylindrical bar 40 in step S200. The LEDs 56 and 58 alternately generate the light beams under the control of the microcomputer 52. Namely, the microcomputer 52 makes the first LED 56 generate the light beam in order to detect the rotational displacement of the cylindrical bar 40 while making the second LED 58 generate the light beam in order to detect the sliding displacement of it. The alternative time-sharing operation of the first and second LEDs 56 and 58 is possibly obtained by the optical fibers to transmit the light beam reflected on the cylindrical bar 40 to the phototransistors 60 and 61. The optical fibers make it possible to reduce the number of the required optical elements such as phototransistors.

In step 210, the light beam reflected on the cylindrical bar 40 is detected by the first and second phototransistors 60 and 61 through the first or second optical fiber 62 or 64. Namely, the reflected light beam is transferred as two rays Ra and Rb through the two sub-fibers of the first or second optical fiber. The two light beams Ra and Rb are respectively converted by the first and second phototransistors 60 and 61 into the corresponding electrical signals Ea and Eb in step S220. The two electrical signals Ea and Eb are analyzed by the microcomputer 52 to calculate the direction and displacement of the cursor movement in step S230. The positional information thus obtained is transferred to the main computer system in S250, finally to move the cursor on the display in X or Y direction according to the positional information in step S260.

Figure 6C:
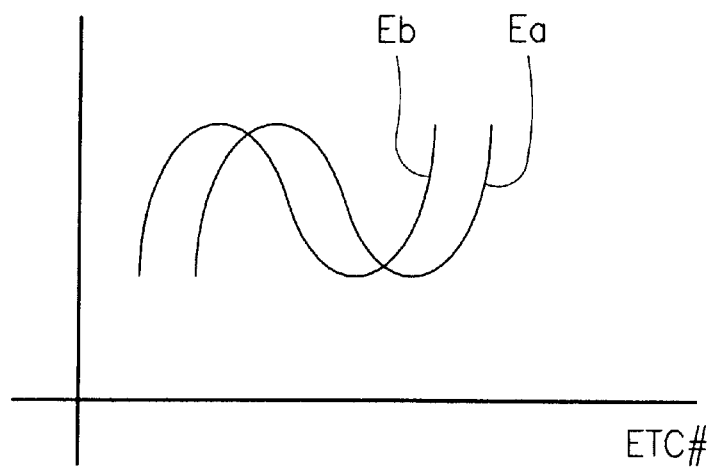

FIG. 9 shows the routine of calculating the direction and displacement of the cursor movement. The direction is determined by detecting the electrical signals Ea and Eb transferred through the phototransistors 60 and 61 to the microcomputer 52, as shown in FIGS. 6A to 6C. Namely, if the phase difference between the pulses Ea and Eb is detected as having a positive value, it means that the cylindrical bar 40 has been displaced toward the positive direction of the X or Y axis of the screen, in step S235. Of course, as previously described in connection with FIGS. 6A to 6C, the displacements of the cursor in the X and Y directions are respectively obtained by the sliding and rotational movements of the cylindrical bar 40. The displacement of the cursor is obtained by counting the number of the pulses Ea or Eb in step S240. Although the present embodiment illustrates the cursor movement made only in one of the two axes X and Y, it may be actually be possible to move the cursor simultaneously both in X and Y axis by alternately generating and detecting the first and second light beams. For example, if the first and second LEDs 56 and 58 are made by time-sharing to alternately generate the light beams toward the first and second marking lines of the cylindrical bar 40, the rotational and sliding movements of the cylindrical bar respectively make it possible to obtain the electrical signals to calculate the direction and displacement of the cursor movements both in X and Y axis.

Figure 10A:
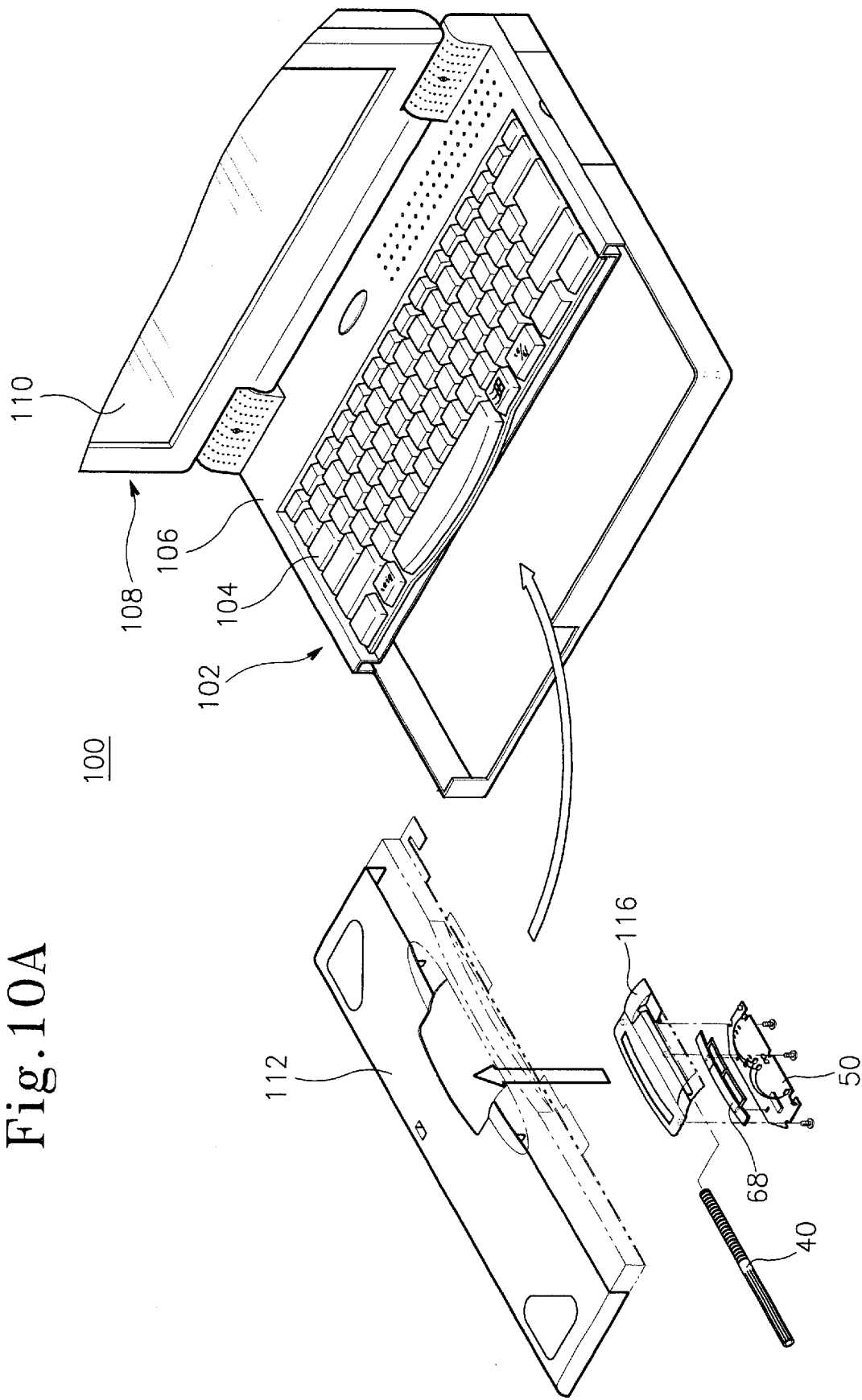
FIGS. 10A and 10B are exploded views illustrating the structure of the inventive pointing device before being mounted in the main housing of a notebook computer.
Figure 10B:
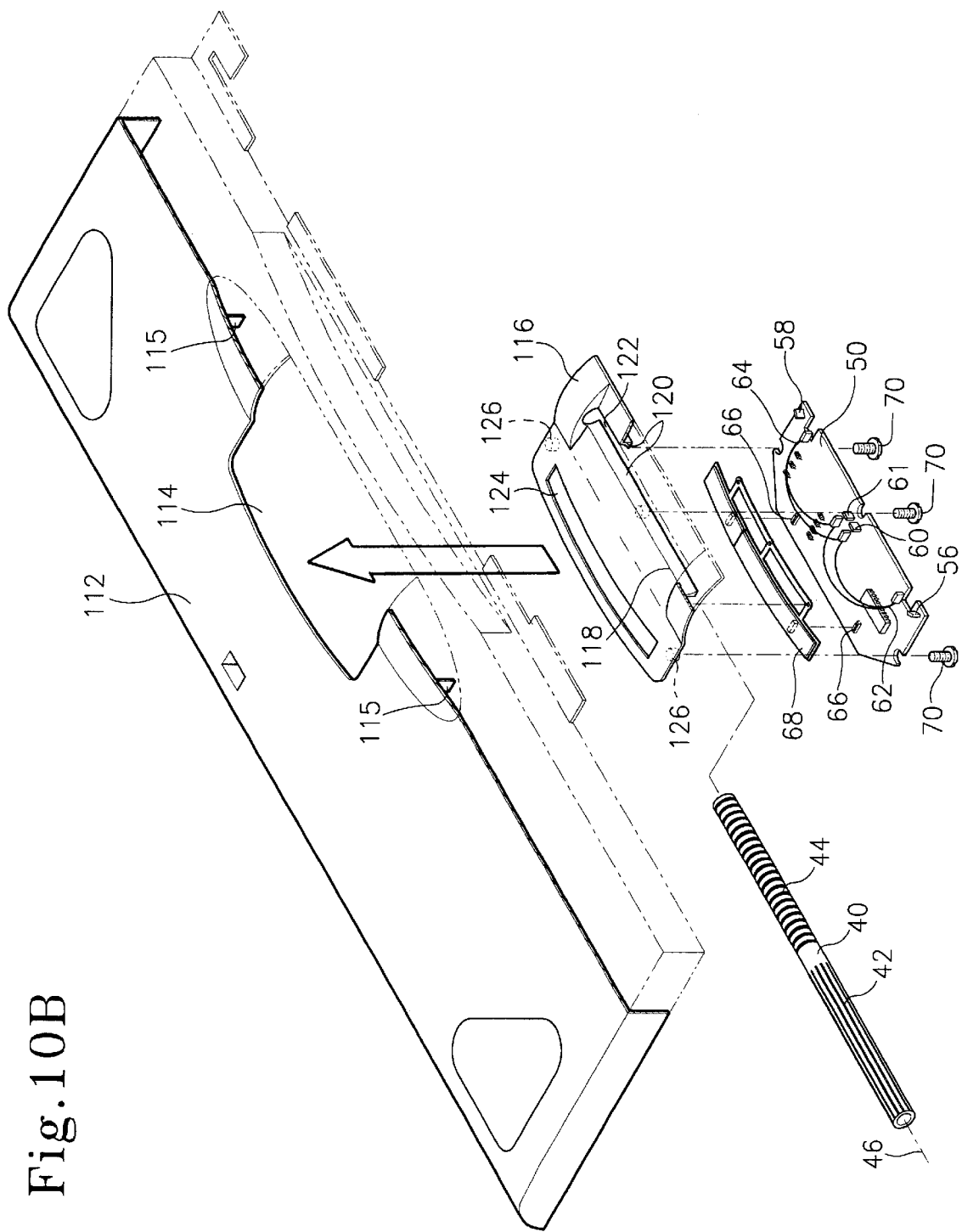
Figure 11:
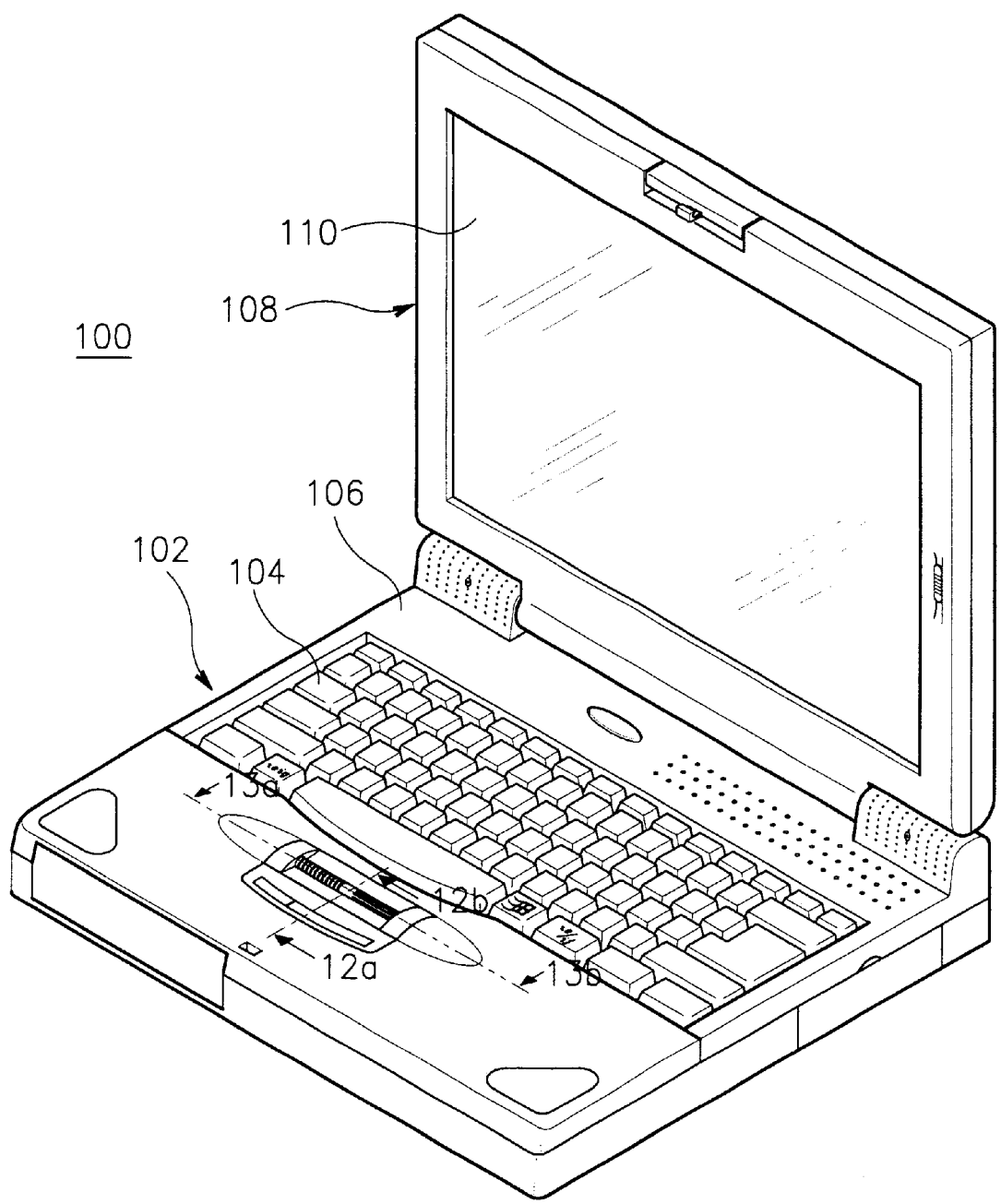
FIG. 11 is a perspective view of a notebook computer provided with a pointing device as shown in FIG. 3.
Figure 12A:
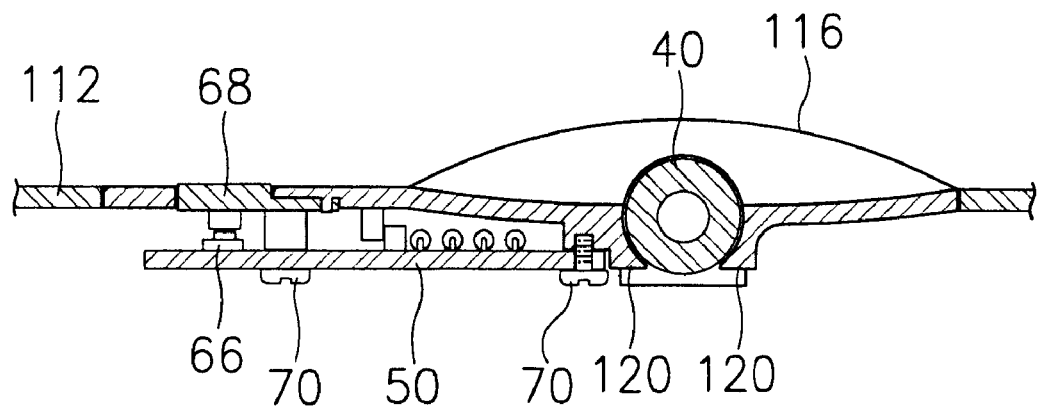
FIG. 12A is a cross-sectional view taken along line 12a–12b of FIG. 11.
Figure 12B:
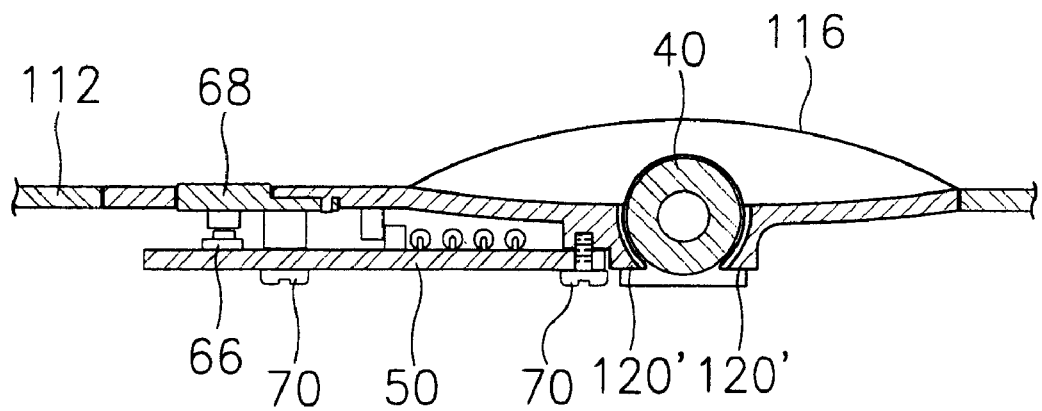
FIG. 12B is a view similar to FIG. 12A except with the pointing device of FIG. 10C being mounted in the notebook computer.

Describing the pointing device mounted in the notebook computer 100 in connection with FIGS. 10A, 10B and 11, the display panel 108 is hinged on the system unit 102. The display panel 108 includes a display assembly 110. The main housing 106 mounting the system unit is provided with a keyboard assembly 104. A pointing device housing 112 is attached to the main housing 106, having a first opening 114 for connecting a panel 116. The panel 116 has a second opening 118 and a lower inside base 120 directly facing the second opening 118. The panel 116 is mounted in the inside of the main housing 106 with the upper surface exposed through the first opening. The panel 116 has a lower inside base 120, which is formed to fit the cylindrical bar 40 to rotate around and slide along its central axis in the second opening. The lower inside base 120 is divided by an elongated slot 122 into two parts. The sliding movement of the cylindrical bar 40 is limited by a pair of stoppers 115. The panel 116 also includes another opening 124 for mounting a button 68 and a plurality of bosses 126 for mounting a circuit board 50. As shown in FIGS. 12A and 12B, the pointing device barely requires mounting space inside the notebook computer, so that the volume of the notebook computer may be reduced.

Another type of the lower inside base 120' may be formed to have a given width at both ends of the second opening 118, as shown in FIGS. 10C, 12B and 13B. Of course, the base 120' has the concave surface to fit the cylindrical bar 40 in the slot 116. The concave surface is divided by a slot 122' elongated in the sliding direction of the cylindrical bar into two parts. The base 120' is made to support the cylindrical bar 40 at both ends so as to reduce the frictional forces against it.

Figure 14:
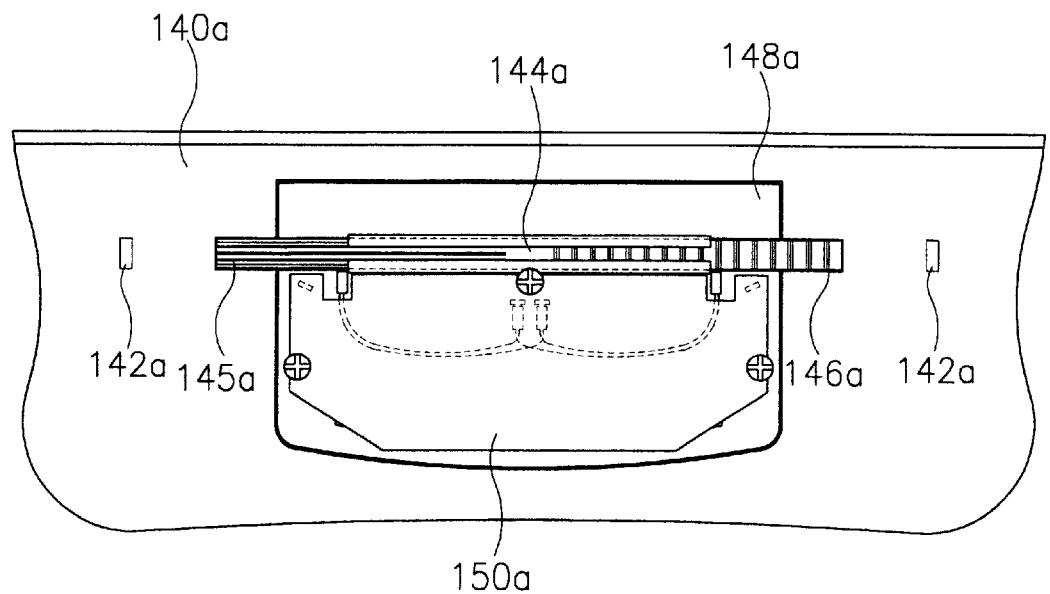
FIG. 14 is a plane view illustrating the stoppers formed on the lower side of the upper part of the notebook computer as shown in FIG. 11, which are to limit the movement of the cylindrical bar of the inventive pointing bar.
Figure 15:
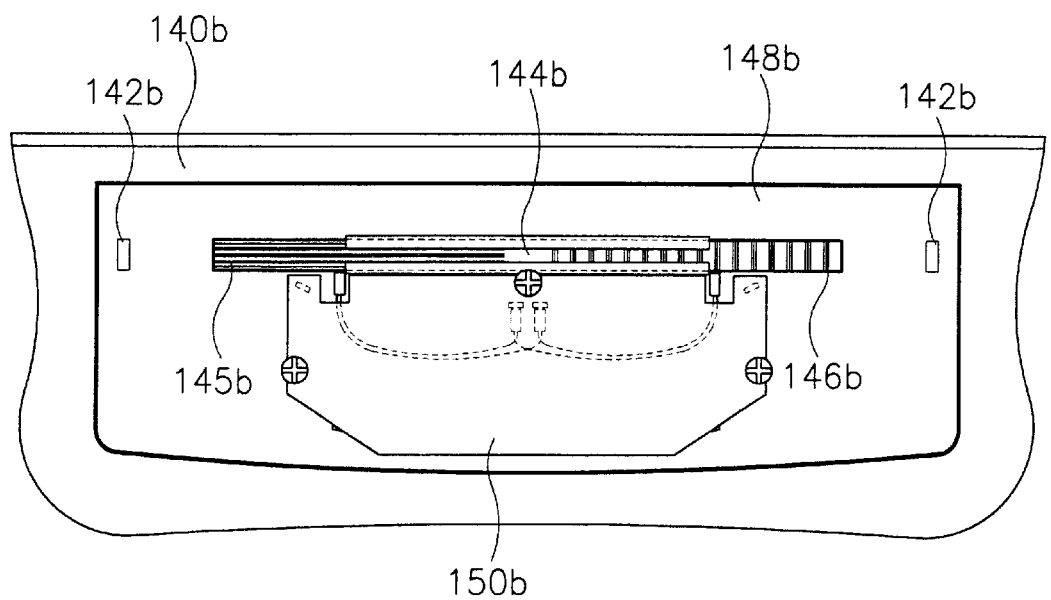
FIG. 15 is a plane view similar to FIG. 14 but with the stoppers being formed on the lower side of the panel for mounting the pointing device.

Referring to FIGS. 14 and 15, the stopper 142a or 142b to limit the sliding movement of the cylindrical bar 144a may be formed beneath the upper plate of the main housing 140a or beneath the panel 148b. The former is to design the pointing device to be integrated into the main housing while the latter is to design it to be readily handled separately from the main housing especially in repairing.

Figure 16:
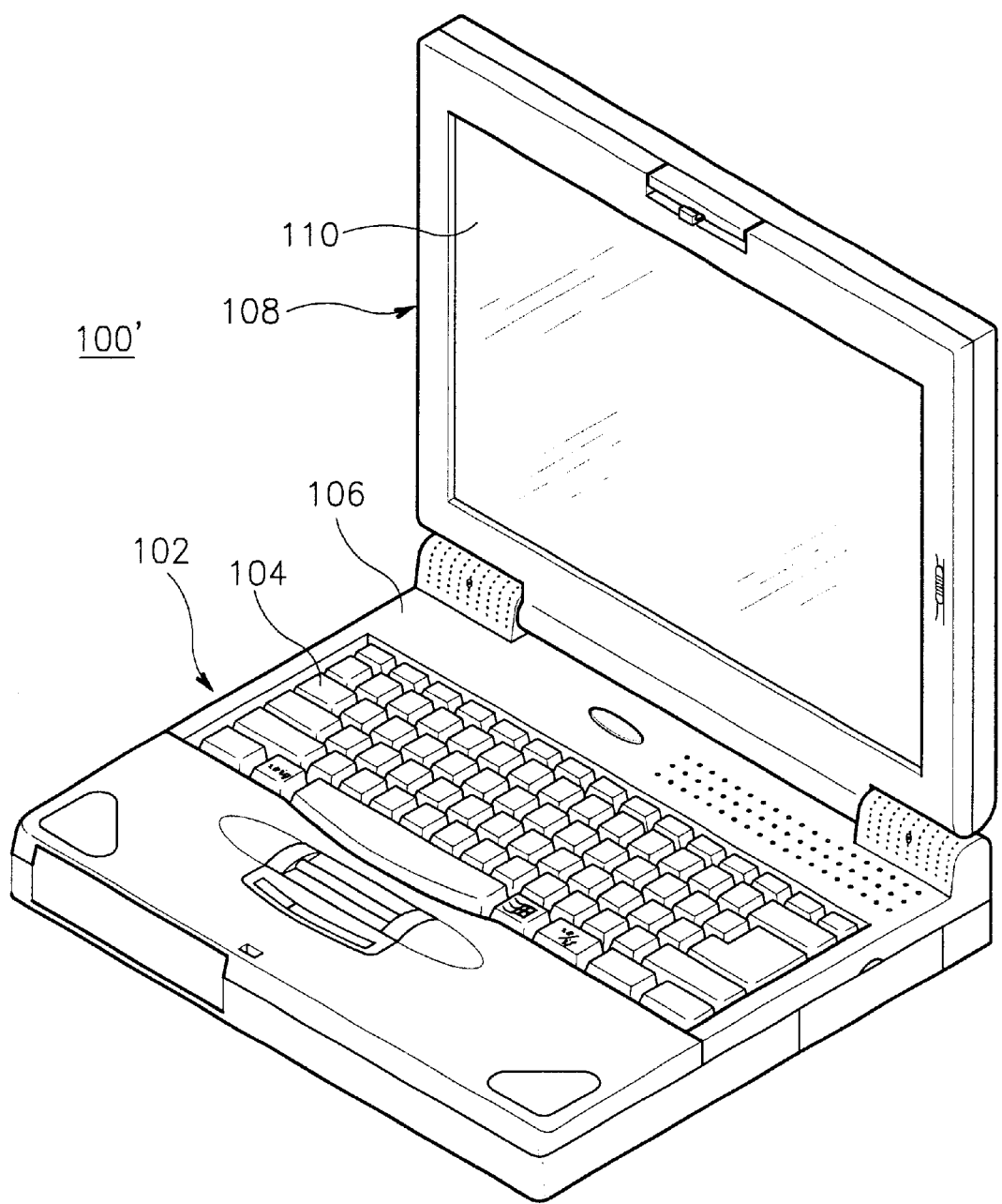
FIG. 16 is a perspective view of a notebook computer illustrating the marking lines of the cylindrical bar not being exposed through the opening to the outside of the computer.
Figure 17:
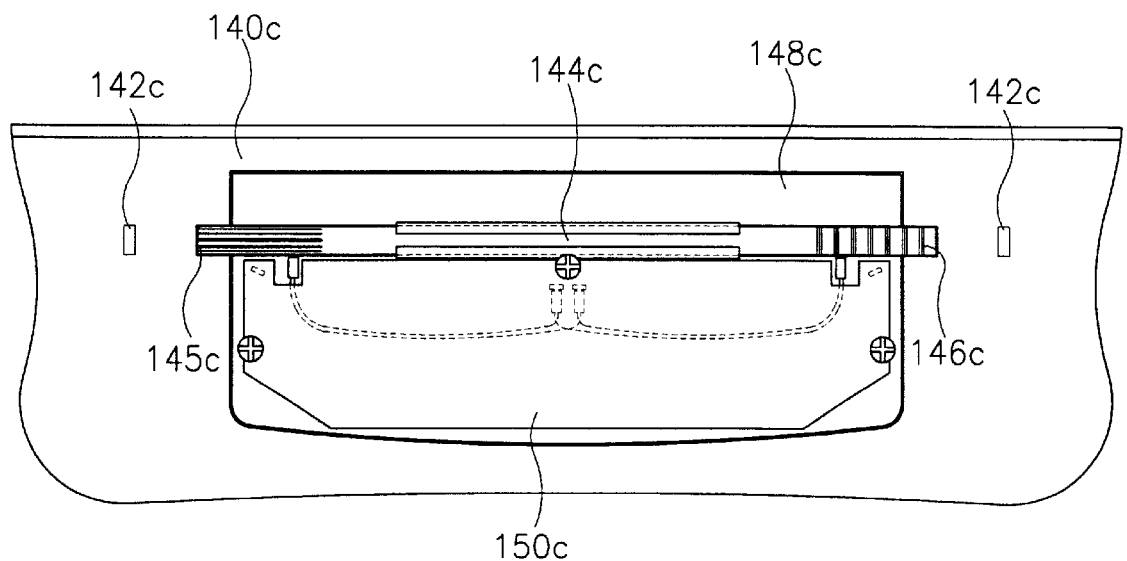
FIG. 17 is a plane view similar to FIG. 14 but with the notebook computer as shown in FIG. 16.
Figure 18:
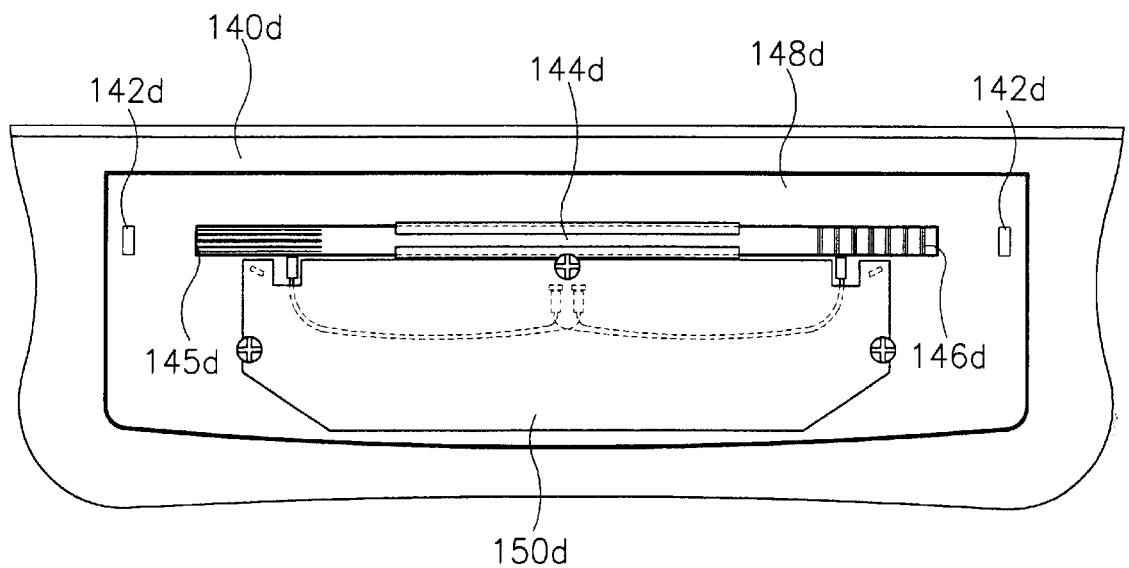
FIG. 18 is a plane view similar to FIG. 15 but with the notebook computer as shown in FIG. 16.

Preferably, as shown in FIGS. 16 to 18, the cylindrical bars 144c and 144d may be mounted in the notebook computer 100' so as not to expose the first and second marking lines 145c, 145d and 146c, 146d through the opening. This is achieved by limiting the portions of the marking lines to a prescribed length from both ends of the cylindrical bar and the sliding range of it. Of course, the stoppers 142c or 142d may be formed in the housing 140c or the panel 148d.

Figure 19:
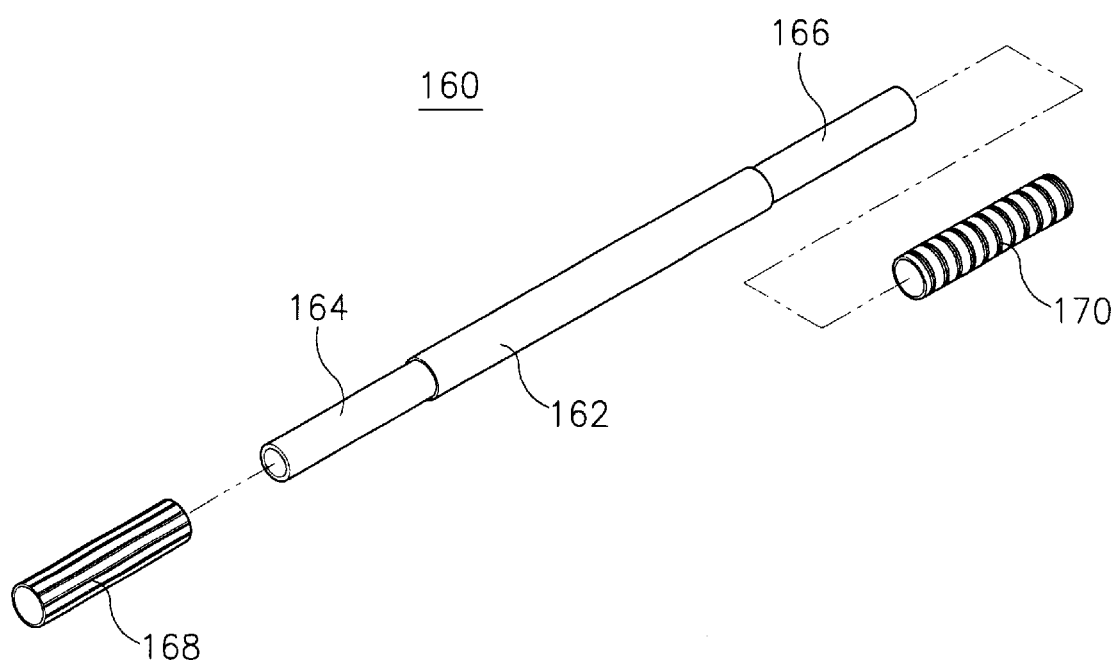
FIG. 19 is an exploded perspective view illustrating the cylindrical bar used in the pointing device according to another embodiment of the present invention.

Referring to FIG. 19, another type of the cylindrical bar 162 may be designed to have first and second tube mount parts 164 and 166 of a given length provided on both ends thereof. A first marking tube 168 is mounted on the first tube mount part 164, and a second marking tube 170 on the second tube mount part 166. The periphery of the first marking tube 168 has a plurality of first marking lines in parallel with the central axis of the cylindrical bar 162 with a constant interval between the adjacent marking lines, and the periphery of the second marking tube 170 has a plurality of second marking lines perpendicular to the first marking lines with a constant interval between the adjacent marking lines.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A pointing device for controlling cursor movement on a computer display by entering positional information into the computer, comprising:

a housing having an upper opening and a lower inside base directly facing said upper opening;

a cylindrical bar mounted on said lower inside base so as to rotate around and slide along its central axis in said upper opening;

a plurality of first marking lines disposed around a part of the periphery of said cylindrical bar adjacent to one end thereof, said first marking lines being in parallel with said central axis and having a constant interval between adjacent marking lines, and said first marking lines being extended to a given length from said one end;

a plurality of second marking lines disposed around another part of the periphery of said cylindrical bar adjacent to another end thereof, said second marking lines being perpendicular to said first marking lines and having a constant interval between adjacent marking lines, and said second marking lines being extended to another given length from said another end;

a detection circuit for respectively measuring the rotational and sliding movements of said cylindrical bar by sensing the movements of said first and second marking lines, and for providing an output signal corresponding thereto; and a microcomputer for analyzing the detection signal output produced by said detection circuit to obtain said positional information.

2. A pointing device for controlling cursor movement on a computer display by entering positional information into the computer, comprising:

a housing having an upper opening and a lower inside base directly facing said upper opening;

a cylindrical bar with a tube mount part of a given length adjacent to each end mounted on said lower inside base so as to rotate around and slide along its central axis in said upper opening;

a first marking tube mounted on the tube mount part at one end of said cylindrical bar and having a plurality of first marking lines disposed around its periphery, said first marking lines being in parallel with said central axis a constant interval between the adjacent marking lines;

a second marking tube mounted on said tube mount part at another end of said cylindrical bar and having a plurality of second marking lines disposed around its periphery, said second marking lines being perpendicular to said first marking lines and having a constant interval between the adjacent marking lines;

a detection circuit for respectively measuring the rotational and sliding movements of said cylindrical bar by sensing the movements of said first and second marking lines; and a microcomputer for analyzing the detection signal produced by said detection circuit to obtain said positional information.

3. A pointing device as defined in claim 1, said first and second marking lines not being visible through said upper opening when said cylindrical bar is actuated.

4. A pointing device as defined in claim 2, said first and second marking lines not being visible through said upper opening when said cylindrical bar is actuated.

5. A pointing device as defined in claim 1, said lower inside base comprising a concave surface with a cross-section fitting the periphery of said cylindrical bar and a slot elongated in the sliding direction of said cylindrical bar to divide said concave surface into two parts, said concave surface being extended from both ends of said upper opening into the inside of said housing in said sliding direction.

6. A pointing device as defined in claim 2, said lower inside base comprising a concave surface with a cross-section fitting the periphery of said cylindrical bar and a slot elongated in the sliding direction of said cylindrical bar to divide said concave surface into two parts, said concave surface being extended from both ends of said upper opening into the inside of said housing in said sliding direction.

7. A pointing device as defined in claim 1, said lower inside base comprising a concave surface with a cross-section fitting the periphery of said cylindrical bar and a slot elongated in the sliding direction of said cylindrical bar to divide said concave surface into two parts, said concave surface having a given width at both ends of said upper opening and being extended therefrom into the inside of said housing in said sliding direction.

8. A pointing device as defined in claim 2, said lower inside base comprising a concave surface with a cross-section fitting the periphery of said cylindrical bar and a slot elongated in the sliding direction of said cylindrical bar to divide said concave surface into two parts, said concave surface having a given width at both ends of said upper opening and being extended therefrom into the inside of said housing in said sliding direction.

9. A pointing device as defined in claim 1, said detection circuit comprising: light emitting diodes (LEDs) mounted near said cylindrical bar for emitting light beams under the control of said microcomputer; optical fibers for transmitting the light beams reflected from said cylindrical bar, and phototransistors for detecting said light beams received from said optical fibers to transfer them to said microcomputer.

10. A pointing device as defined in claim 1 said detection circuit comprising: light emitting diodes (LEDs) mounted near said cylindrical bar for emitting light beams under the control of said microcomputer; optical fibers for transmitting the light beams reflected from said cylindrical bar, and phototransistors for detecting said light beams received from said optical fibers to transfer them to said microcomputer.

11. A pointing device as defined in claim 1, the width of each of said first and second marking lines and said interval between said adjacent marking lines being equal, and smaller than twice the diameter of the optical fiber.

12. A pointing device as defined in claim 10, the width of each of said first and second marking lines and said interval between said adjacent marking lines being equal, and smaller than twice the diameter of the optical fiber.

13. A computer system including a main housing for mounting a microcomputer, a first opening formed in the upper surface of said main housing, a display, and a pointing device for controlling cursor movement on said display screen by entering positional information into the computer, said pointing device comprising:
    a panel having a second opening and a lower inside base directly facing said second opening, said panel being mounted in the inside of said main housing with the upper surface exposed through said first opening;
    a cylindrical bar mounted on said lower inside base so as to rotate around and slide along its central axis in said second opening and being exposed in said second opening;
    a detection circuit for detecting the rotational and sliding movements of said cylindrical bar; and
    a controller for analyzing the detection signal produced by said detection circuit to obtain said positional information.

14. A computer system including a main housing for mounting a microcomputer, a first opening formed in the upper surface of said main housing, a display, and a pointing device for controlling cursor movement on said display screen by entering positional information into the computer, said pointing device comprising:
    a panel having a second opening and a lower inside base directly facing said second opening, said panel being mounted in the inside of said main housing with the upper surface exposed through said first opening;
    a cylindrical bar mounted on said lower inside base so as to rotate around and slide along its central axis in said second opening and being exposed in said second opening;
    a detection circuit for detecting the rotational and sliding movements of said cylindrical bar; and
    a controller for analyzing the detection signal produced by said detection circuit to obtain said positional information, said cylindrical bar further comprising;
        a plurality of first marking lines disposed around a part of the periphery adjacent to one end thereof, said first marking lines being in parallel with said central axis and having a constant interval between adjacent marking lines, and said first marking lines being extended to a given length from said one end; and
        a plurality of second marking lines disposed around another part of the periphery adjacent to another end thereof, said second marking lines being perpendicular to said first marking lines and having a constant interval between adjacent marking lines, and said second marking lines being extended to a given length from said another end; and
        said detection circuit respectively measuring the rotational and sliding movements of said cylindrical bar by sensing the movements of said first and second marking lines.

15. A computer system including a main housing for mounting a microcomputer, a first opening formed in the upper surface of said main housing, a display, and a pointing device for controlling cursor movement on said display screen by entering positional information into the computer, said pointing device comprising:
    a panel having a second opening and a lower inside base directly facing said second opening, said panel being mounted in the inside of said main housing with the upper surface exposed through said first opening;
    a cylindrical bar mounted on said lower inside base so as to rotate around and slide along its central axis in said second opening and being exposed in said second opening;
    a detection circuit for detecting the rotational and sliding movements of said cylindrical bar; and
    a controller for analyzing the detection signal produced by said detection circuit to obtain said positional information, said cylindrical bar comprising:
        a tube mount part of a given length provided adjacent to each end thereof;
        a first marking tube mounted on the tube mount part at one end of said cylindrical bar and having a plurality of first marking lines disposed around its periphery, said first marking lines being in parallel with said central axis and having a constant interval between adjacent marking lines; and
        a second marking tube mounted on the tube mount part at another end of said cylindrical bar and having a plurality of second marking lines disposed around its periphery, said second marking lines being perpendicular to said first marking lines and having a constant interval between adjacent marking lines; and said detection circuit respectively measuring the rotational and sliding movements of said cylindrical bar by sensing the movements of said first and second marking lines.

16. A computer system as defined in claim 14, said main housing further comprising a pair of stoppers for respectively limiting the sliding movement of said cylindrical bar.

17. A computer system as defined in claim 14, said panel further comprising a pair of stoppers for respectively limiting the sliding movement of said cylindrical bar.

18. A method of controlling cursor movement on the display of a computer system by entering positional information into the computer, comprising the steps of:

sending one of first and second light beams to a cylindrical bar;

sensing the light beam reflected by said cylindrical bar through a pair of optical fibers;

converting the two light beams received by said pair of optical fibers into two respective electrical signals;

analyzing said two electrical signals to obtain the measurement of said cursor movement in one of the X and Y directions in a Cartesian coordinate system;

sending the other light beams to a cylindrical bar;

sensing the light beam reflected by said cylindrical bar through another pair of optical fibers;

converting the two light beams received by said another pair of optical fibers into two other respective electrical signals;

analyzing said two other electrical signals to obtain the measurement of said cursor movement in the other direction in the cartesian coordinate system;

transferring the measurement information to said computer system; and moving the cursor on said display in the X and Y directions according to said measurement information.

19. A method as defined in claim 18, the step of obtaining the measurement of said cursor movement in the X or Y direction further comprising the steps of:

calculating the phase difference of the two electrical signals to determine whether the directional information is positive or negative; and counting the number of the pulses of one of said two electrical signals.

\* \* \* \* \*